US012695568B2

(12) United States Patent　　(10) Patent No.:　US 12,695,568 B2
Hindy et al.　　(45) Date of Patent:　Jul. 28, 2026

(54) CONFIGURING TRACKING REFERENCE SIGNAL RESOURCES

(71) Applicant: Lenovo (Singapore) Pte. Ltd., New Tech Park (SG)

(72) Inventors: Ahmed Monier Ibrahim Saleh Hindy, Aurora, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 282 days.

(21) Appl. No.: 18/263,272

(22) PCT Filed: Jan. 20, 2022

(86) PCT No.: PCT/IB2022/050493
§ 371 (c)(1),
(2) Date: Jul. 27, 2023

(87) PCT Pub. No.: WO2022/162507
PCT Pub. Date: Aug. 4, 2022

(65) Prior Publication Data
US 2024/0137175 A1　　Apr. 25, 2024

Related U.S. Application Data

(60) Provisional application No. 63/142,481, filed on Jan. 27, 2021.

(51) Int. Cl.
*H04W 72/1273*　　(2023.01)
*H04L 5/00*　　(2006.01)

(52) U.S. Cl.
CPC .......... *H04L 5/0051* (2013.01); *H04L 5/0035* (2013.01); *H04W 72/1273* (2013.01)

(58) Field of Classification Search
CPC ........ H04W 725/1273; H04W 72/1273; H04L 5/0051; H04L 5/0035
See application file for complete search history.

(56) References Cited

U.S. PATENT DOCUMENTS 11,736,252 B2 * 8/2023 Ji .......................... H04L 5/0048
370/329
11,973,705 B2 * 4/2024 Sun ........................ H04B 7/026
(Continued)

OTHER PUBLICATIONS

PCT/IB2022/050493, "Notification of Transmittal of the International Search Report and the Written Opinion of the International Searching Authority, or the Declaration", International Searching Authority, May 17, 2022, pp. 1-12.
(Continued)

*Primary Examiner* — Kent Krueger
(74) *Attorney, Agent, or Firm* — Kunzler Needham Hilton

(57) ABSTRACT

Apparatuses, methods, and systems are disclosed for configuring tracking reference signal resources. One method includes receiving an indication of a HST SFN transmission from at least one TRP in a network. The method includes configuring the UE with two TRS resources. The method includes receiving a downlink scheduling grant that includes a TCI codepoint indicating two TCI states corresponding to the two TRS resources. The method includes configuring the UE to report at least one Doppler indicator value to the network based on received TRSs. The method includes identifying the at least one Doppler indicator value. The method includes reporting the at least one Doppler indicator value to the network. The method includes receiving at least one DMRS port corresponding to each layer of a PDSCH, PDCCH, or a combination thereof.

20 Claims, 6 Drawing Sheets

(56) References Cited

U.S. PATENT DOCUMENTS

| | | | | |
|---|---|---|---|---|
| 12,081,480 | B2 * | 9/2024 | Sun ........................ | H04L 5/0051 |
| 2020/0374079 | A1 * | 11/2020 | Chervyakov ....... | H04L 27/2657 |
| 2023/0216627 | A1 * | 7/2023 | Wang .................... | H04B 7/063 |
| | | | | 370/329 |

OTHER PUBLICATIONS

CATT, "On enhancements on HST-SFN deployment", 3GPP TSG RAN WG1 #103-e R1-2007828, Oct. 26-Nov. 13, 2020, pp. 1-13.

Lenovo et al., "Enhancements for HST-SFN deployment", 3GPP TSG RAN WG1 #104-e R1-2100988, Jan. 25-Feb. 5, 2021, pp. 1-10.

Nokia et al., "Enhancements for HST-SFN deployment", 3GPP TSG RAN WG1 #104-e Meeting R1-2101009, Jan. 25-Feb. 5, 2021, pp. 1-12.

Qualcomm Inc., "Enhancements on HST-SFN deployment", 3GPP TSG-RAN WG1 Meeting #104-e R1-2101450, Jan. 25-Feb. 5, 2021, pp. 1-29.

3GPP, "3rd Generation Partnership Project; Technical Specification Group Radio Access Network; NR; Physical channels and modulation (Release 16)", 3GPP TS 38.211 V16.3.0, Sep. 2020, pp. 1-133.

3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.

3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

* cited by examiner

200

300

400

600

CONFIGURING TRACKING REFERENCE SIGNAL RESOURCES

CROSS-REFERENCE TO RELATED APPLICATIONS

This application claims priority to U.S. Patent Application Ser. No. 63/142,481 entitled "APPARATUSES, METHODS, AND SYSTEMS FOR COMBINED UE-OFFSET FREQUENCY PRE-COMPENSATION FOR HIGH SPEED SCENARIOS UNDER A SINGLE FREQUENCY NETWORK" and filed on Jan. 27, 2021 for Ahmed Monier Ibrahim Saleh Hindy, which is incorporated herein by reference in its entirety.

FIELD

The subject matter disclosed herein relates generally to wireless communications and more particularly relates to configuring tracking reference signal resources.

BACKGROUND

In certain wireless communications networks, there may be a doppler shift in transmissions from transmission and reception points. In such networks, there may be estimation errors and performance degradation.

BRIEF SUMMARY

Methods for configuring tracking reference signal resources are disclosed. Apparatuses and systems also perform the functions of the methods. One embodiment of a method includes receiving, at a user equipment (UE), an indication of a high speed train (HST) single frequency network (SFN) transmission from at least one transmission and reception point (TRP) in a network. In some embodiments, the method includes configuring the UE with two tracking reference signal (TRS) resources. In certain embodiments, the method includes receiving a downlink scheduling grant. The downlink scheduling grant includes a transmission configuration indicator (TCI) codepoint indicating two TCI states corresponding to the two TRS resources. In various embodiments, the method includes configuring the UE to report at least one Doppler indicator value to the network based on received TRSs. In some embodiments, the method includes identifying the at least one Doppler indicator value. In certain embodiments, the method includes reporting the at least one Doppler indicator value to the network. In various embodiments, the method includes receiving at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value.

One apparatus for configuring tracking reference signal resources includes a user equipment. In some embodiments, the apparatus includes a receiver that receives an indication of a high speed train (HST) single frequency network (SFN) transmission from at least one transmission and reception point (TRP) in a network. In various embodiments, the apparatus includes a processor that configures the UE with two tracking reference signal (TRS) resources. In certain embodiments, the apparatus includes a transmitter. In some embodiments, the receiver receives a downlink scheduling grant. The downlink scheduling grant includes a transmission configuration indicator (TCI) codepoint indicating two TCI states corresponding to the two TRS resources. The processor configures the UE to report at least one Doppler indicator value to the network based on received TRSs. The processor identifies the at least one Doppler indicator value. The transmitter reports the at least one Doppler indicator value to the network. The receiver receives at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value.

Another embodiment of a method for configuring tracking reference signal resources includes transmitting, from a network device, an indication of a high speed train (HST) single frequency network (SFN) transmission from at least one transmission and reception point (TRP) in a network. A user equipment (UE) is configured with two tracking reference signal (TRS) resources. In some embodiments, the method includes transmitting a downlink scheduling grant. The downlink scheduling grant includes a transmission configuration indicator (TCI) codepoint indicating two TCI states corresponding to the two TRS resources. The UE is configured to report at least one Doppler indicator value to the network based on received TRSs, and the UE identifies the at least one Doppler indicator value. In certain embodiments, the method includes receiving the at least one Doppler indicator value. In various embodiments, the method includes transmitting at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value.

Another apparatus for configuring tracking reference signal resources includes a network device. In some embodiments, the apparatus includes a transmitter that transmits an indication of a high speed train (HST) single frequency network (SFN) transmission from at least one transmission and reception point (TRP) in a network. A user equipment (UE) is configured with two tracking reference signal (TRS) resources. In various embodiments, the apparatus includes a receiver. The transmitter transmits a downlink scheduling grant. The downlink scheduling grant includes a transmission configuration indicator (TCI) codepoint indicating two TCI states corresponding to the two TRS resources. The UE is configured to report at least one Doppler indicator value to the network based on received TRSs, and the UE identifies the at least one Doppler indicator value. The receiver receives the at least one Doppler indicator value. The transmitter transmits at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
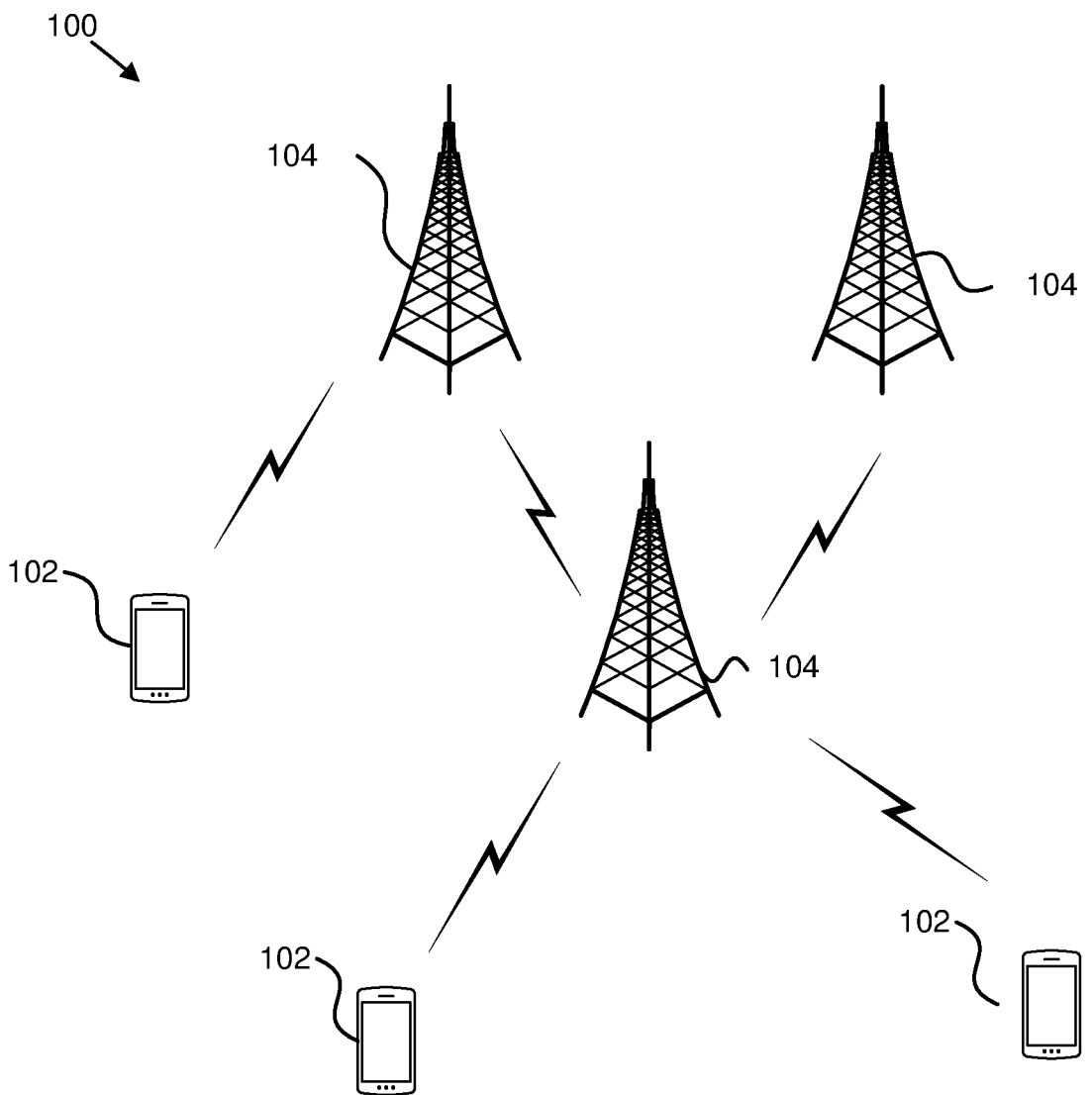
FIG. 1 is a schematic block diagram illustrating one embodiment of a wireless communication system for configuring tracking reference signal resources.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring tracking reference signal resources. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive an indication of a high speed train (HST) single frequency network (SFN) transmission from at least one transmission and reception point (TRP) in a network. In some embodiments, the remote unit 102 may configure the UE with two tracking reference signal (TRS) resources. In certain embodiments, the remote unit 102 may receive a downlink scheduling grant. The downlink scheduling grant includes a transmission configuration indicator (TCI) codepoint indicating two TCI states corresponding to the two TRS resources. In various embodiments, the remote unit 102 may configure the UE to report at least one Doppler indicator value to the network based on received TRSs. In some embodiments, the remote unit 102 may identify the at least one Doppler indicator value. In certain embodiments, the remote unit 102 may report the at least one Doppler indicator value to the network. In various embodiments, the remote unit 102 may receive at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value. Accordingly, the remote unit 102 may be used for configuring tracking reference signal resources.

In certain embodiments, a network unit 104 may transmit an indication of a high speed train (HST) single frequency network (SFN) transmission from at least one transmission and reception point (TRP) in a network. A user equipment (UE) is configured with two tracking reference signal (TRS) resources. In some embodiments, the network unit 104 may transmit a downlink scheduling grant. The downlink scheduling grant includes a transmission configuration indicator (TCI) codepoint indicating two TCI states corresponding to the two TRS resources. The UE is configured to report at least one Doppler indicator value to the network based on received TRSs, and the UE identifies the at least one Doppler indicator value. In certain embodiments, the network unit

104 may receive the at least one Doppler indicator value. In various embodiments, the network unit 104 may transmit at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value. Accordingly, the network unit 104 may be used for configuring tracking reference signal resources.

Figure 2:
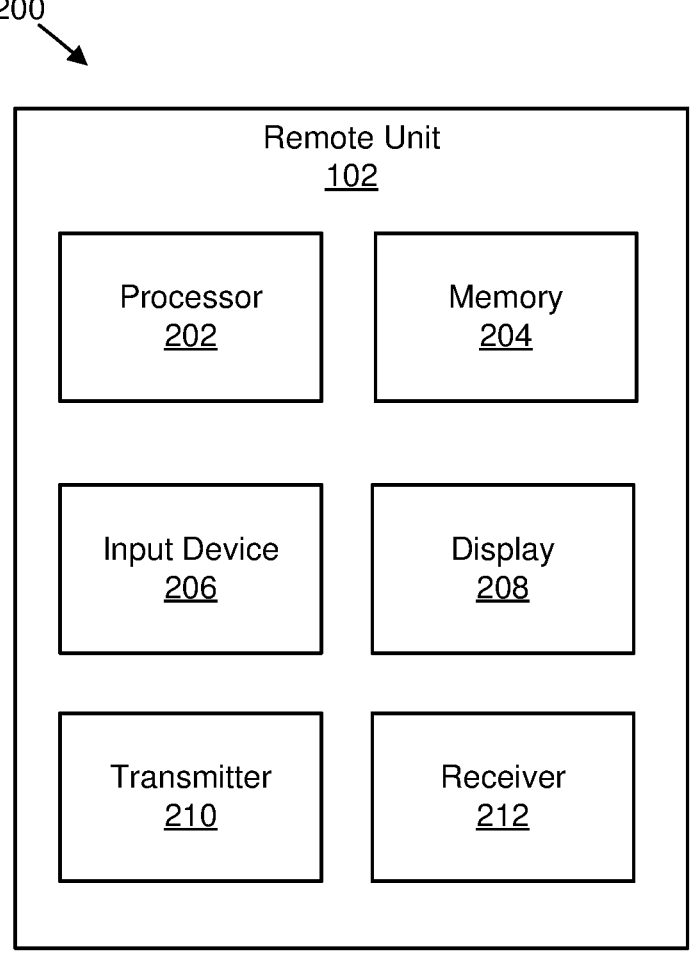
FIG. 2 is a schematic block diagram illustrating one embodiment of an apparatus that may be used for configuring tracking reference signal resources.

FIG. 2 depicts one embodiment of an apparatus 200 that may be used for configuring tracking reference signal resources. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives an indication of a high speed train (HST) single frequency network (SFN) transmission from at least one transmission and reception point (TRP) in a network. In various embodiments, the processor 202 configures the UE with two tracking reference signal (TRS) resources. In some embodiments, the receiver 212 receives a downlink scheduling grant. The downlink scheduling grant includes a transmission configuration indicator (TCI) codepoint indicating two TCI states corresponding to the two TRS resources. The processor 202 configures the UE to report at least one Doppler indicator value to the network based on received TRSs. The processor 202 identifies the at least one Doppler indicator value. The transmitter 210 reports the at least one Doppler indicator value to the network. The receiver 212 receives at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
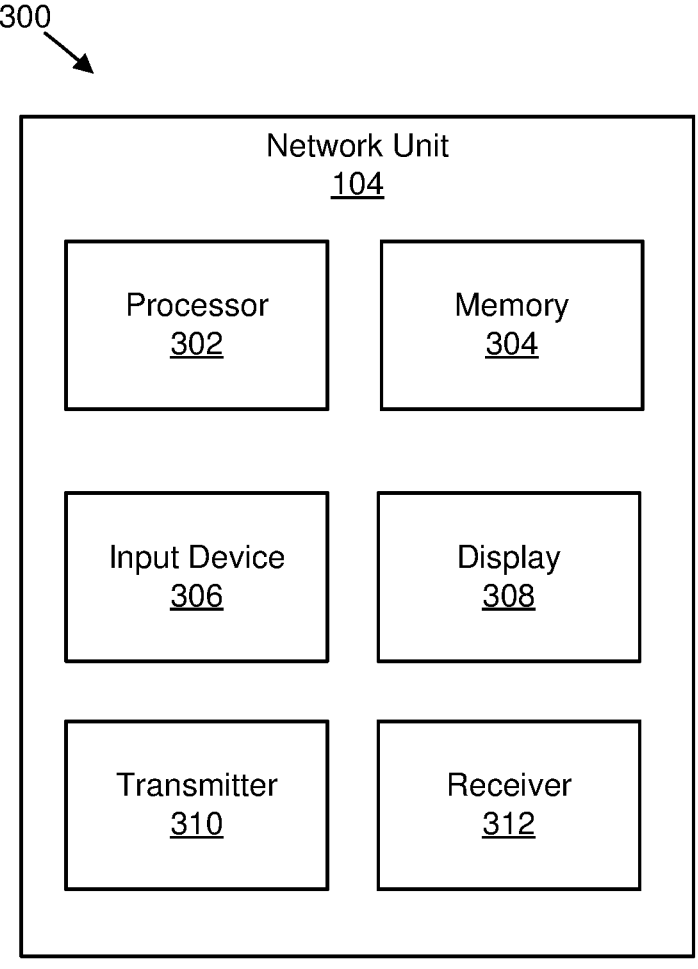
FIG. 3 is a schematic block diagram illustrating one embodiment of an apparatus that may be used for configuring tracking reference signal resources.

FIG. 3 depicts one embodiment of an apparatus 300 that may be used for configuring tracking reference signal resources. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 transmits an indication of a high speed train (HST) single frequency network (SFN) transmission from at least one transmission and reception point (TRP) in a network. A user equipment (UE) is configured with two tracking reference signal (TRS) resources. The transmitter 310 transmits a downlink scheduling grant. The downlink scheduling grant includes a transmission configuration indicator (TCI) codepoint indicating two TCI states corresponding to the two TRS resources. The UE is configured to report at least one Doppler indicator value to the network based on received TRSs, and the UE identifies the at least one Doppler indicator value. The receiver 312 receives the at least one Doppler indicator value. The transmitter 310 transmits at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value.

In certain embodiments, high speed rail may be expanding in Europe and Asia alongside with a number of passengers with smart devices like laptops and mobile phones. In some embodiments, current technologies support data ranges from tens of kbps to tens of Mbps which may not be enough to handle demand for high-data-rates and increased reliability and/or latency for on-board broadband services.

In various embodiments, such as in a single frequency network ("SFN") deployment scenario (e.g., all cells operate at the same frequency), multiple remote radio heads may be located along a railway and connected to a central unit (e.g., via fiber). In such embodiments, the radio heads may share the same cell identifier ("ID"). In certain embodiments, if transmission from transmit-receive points ("TRPs") within a cell are synchronized, SFN deployment may enlarge cell coverage, reduce frequency of handovers, and/or achieve transmission diversity and power gain. Based on a 6 dB pathloss difference between any two TRPs, a train may take advantage of two simultaneous TRP transmissions for sessions of at least 4 seconds long, assuming a train speed of 500 km/hr.

In some embodiments, for SFN transmission, a physical downlink shared channel ("PDSCH") is repeated from two TRPs using a single scheduling downlink control information ("DCI") indicating a single demodulation reference signal ("DMRS") port and a single transmission configuration indicator ("TCI") state. In various embodiments, Doppler shift for the transmission from a first TRP may be different than Doppler shift from a second TRP. In certain embodiments, a receiver uses long-term channel statistics (e.g., Doppler shift, Doppler spread, average delay, and/or delay spread) associated with an indicated TCI state to estimate an aggregate channel. Such embodiments may lead to estimation errors and performance degradation.

In various embodiments, a single DCI multi-TRP transmission may be used (e.g., multi-TRP ultra-reliable low-latency communication ("URLLC") spatial division multiplexing ("SDM") repetition scheme). The DCI may indicate DMRS ports from different code division multiplexing ("CDM") groups along with a TCI codepoint indicating two TCI states. Some layers of the transmitted transport block ("TB") may be sent from a first TRP and some layers from a second TRP. This may cause interlayer interference and may not achieve a power gain, hence there may be no increase in cell coverage. Also, due to a varying proximity of the two TRPs to a user equipment ("UE"), a signal to noise ratio ("SNR") gap between signals from the two TRPs may lead to constraining a modulation and coding scheme ("MCS") level (e.g., via a channel quality indicator ("CQI"))

to the worse of both transmissions, assuming a single continuous waveform ("CW").

In certain embodiments, there may be different versions of offset frequency-pre-compensation schemes as well as different approaches to activate and/or deactivate schemes or toggle from one scheme to another.

In some embodiments, one or more elements or features from one or more of the described embodiments may be combined. Moreover, a TRS may be equivalent to a channel state information ("CSI") reference signal ("RS") ("CSI-RS") resource in a non-zero power ("NZP") CSI-RS ("NZP-CSI-RS") resource set configured with a higher layer parameter (e.g., trs-Info).

In various embodiments, there may be an indication of a high speed train ("HST") SFN ("HST-SFN") transmission.

In certain embodiments, a network may configure a UE with mTRP transmission under HST-SFN mode via a combination of one or more indications.

In some embodiments, there may be one or more higher-layer parameters to indicate HST-SFN transmission (e.g., highSpeedFlag), which may be configured and/or set to one (e.g., the UE may be configured for HST-SFN transmission). In one example, a higher-layer parameter appears in DMRS-DownlinkConfig information element ("IE"), Down-linkConfigCommon IE, ServingCellConfig, PDSCH-Config, PDSCH-ServingCellConfig, or BWP-DownlinkDedicated. In various embodiments, there may be an additional bit in a DCI field that indicates whether HST-SFN transmission is activated.

In certain embodiments, there may be a modified CSI-ReportConfig reporting setting (e.g., having new possible values for a higher-layer parameter reportQuantity reporting quantities indicated in a CSI reporting setting (e.g., 'cri-RI-PMI-CQI-DI'), where ("DI") may be a new quantity representing a Doppler indication.

In some embodiments, quasi-co-location ("QCL") relationship types between different reference signals ("RSs") including but not limited to QCL relationship between a TRS and a synchronization signal block ("SSB"), or between DMRS for PDSCH and TRS. An example of an additional QCL relationship type would be a new QCL type other than 'TypeA', 'TypeB', 'TypeC' or 'TypeD'. The new QCL type (e.g., 'TypeE' may have the two RSs of interest not being QCLed with one or more of Doppler shift and Doppler spread).

In various embodiments, implied from an indicated value in a TCI field in DCI, a codepoint may refer to one or more TCI states. An underlying QCL relationship between a source RS and a reference RS may be exclusively used for HST-SFN transmission. In one example, the TCI codepoint refers to 2 TCI states, wherein the underlying QCL type corresponding to one or more of the 2 TCI states is 'QCL-TypeE', and wherein 'QCL-TypeE' refers to one or more of Doppler shift and Doppler spread.

In certain embodiments, an indication may be implied from an RRC parameter corresponding to multi-TRP transmission scheme. In one example, an RRC parameter repetitionScheme-r17 takes on a value 'HSTSchemeA' which may imply an HST-SFN transmission is supported. The RRC parameter repetitionScheme-r17 may be configured as part of one or more of the PDSCH configuration IE (e.g., PDSCH-Config or PDCCH configuration IE such as PDCCH-Config).

In some embodiments, an indication may be implied from a time domain resource allocation ("TDRA") parameter in a PDSCH configuration. In one example, the HST-SFN scheme may be implied from RRC parameter pdsch-Time-DomainAllocationList in PDSCH-Config.

In various embodiments, an indication may be implied from a number of configured CDM groups for DMRS for PDSCH.

In one example, a HST-SFN scheme 'HSTScheme-A' is indicated whenever an RRC parameter highSpeedFlag is set to true in a DMRS downlink configuration IE (e.g., DMRS-DownlinkConfig), and if the indicated TCI codepoint in the DCI field corresponds to 2 TCI states.

In certain embodiments, there may be an offset frequency pre-compensation (e.g., offset frequency pre-compensation scheme).

In a first embodiment, one TRS may be configured with a single TCI state, wherein the TCI state corresponds to a QCL relationship 'QCLType-A' and 'QCLType-D' (e.g., if applicable) between the TRS and one or more of DMRS for PDSCH and PDCCH for DMRS. In one example, the NZP CSI-RS resource ID corresponding to the TRS may be included in the csi-RS-Index RRC parameter within the spatial relation information SpatialRelationInfo of the corresponding SRS configuration that is configured by the network. In another example, a QCL relationship is between the TRS on one hand and the corresponding configured SRS on the other hand, whereas the QCL relationship is 'QCL-Type-A' and 'QCLType-D' (e.g., if applicable).

In a second embodiment, two TRS resources may be configured with a single TCI state, wherein the TCI state corresponds to a QCL relationship 'QCLType-A' and 'QCL-Type-D' (e.g., if applicable) between a first of the two TRS resources and one or more of DMRS for PDSCH and PDCCH for DMRS, whereas no TCI state is indicated for a second of two TRS resource with either DMRS for PDSCH, or PDCCH for DMRS, or both. In one example, a NZP CSI-RS resource ID corresponding to the first TRS may be included in a csi-RS-Index RRC parameter within the spatial relation information SpatialRelationInfo of the corresponding SRS configuration that is configured by the network. In another example, the NZP CSI-RS resource ID corresponding to the first TRS may be included in the csi-RS-Index RRC parameter within the spatial relation information Spa-tialRelationInfo of the corresponding SRS configuration that is configured by the network. In yet another example, a QCL relationship is introduced between one or more of the first and second TRS resource on one hand and the corresponding configured SRS on the other hand, whereas the QCL relationship is 'QCLType-A' and 'QCLType-D' (e.g., if applicable).

In a third embodiment, two TRS resources are configured with two TCI states represented by a single TCI codepoint, wherein a first of the two TCI state corresponds to a QCL relationship 'QCLType-A' and 'QCLType-D' (e.g., if applicable) between a first of the two TRS resources and one or more of DMRS for PDSCH and PDCCH for DMRS, whereas a second of the two TCI states corresponds to a QCL relationship QCL-Value and 'QCLType-D' (e.g., if applicable) between a second of the two TRS resources and one or more of DMRS for PDSCH and PDCCH for DMRS. Here, a QCL-Value corresponds to a QCL type that may be set to one or more of 'QCLType-A' and 'QCLType-E', wherein 'QCLType-E' is a QCL relationship that does not include either the Doppler shift or Doppler spread parameters. In one example, the NZP CSI-RS resource ID corresponding to the first TRS may be included in the csi-RS-Index RRC parameter within the Spatial Relation Information SpatialRelationInfo of the corresponding SRS configuration that is configured by the network. In another example, the NZP CSI-RS resource ID corresponding to the first TRS may be included in the csi-RS-Index RRC parameter within the spatial relation information SpatialRelation-Info of the corresponding SRS configuration that is configured by the network. In yet another example, a QCL relationship is used between the first TRS resource on one hand and the corresponding configured SRS on the other hand, whereas the QCL relationship is 'QCLType-A' and 'QCLType-D' (e.g., if applicable). In another example, a QCL relationship is introduced between the second TRS resource on one hand and the corresponding configured SRS on the other hand, whereas the QCL relationship is QCL-Value and 'QCLType-D' (e.g., if applicable), wherein the QCL-Value corresponds to a QCL type that may be set to one or more of 'QCLType-A' and 'QCLType-E', wherein 'QCLType-E' is a QCL relationship that does not include either the Doppler shift or Doppler spread parameters.

In some embodiments, there may be an indication of an offset frequency pre-compensation. In one embodiment, a higher-layer parameter is used to configure an offset frequency pre-compensation scheme (e.g., offset-frequency-Precompensation) which, if configured and/or set to true, the offset frequency of one or more of the TRS, DMRS for PDSCH and DMRS for PDCCH and may be pre-compensated with a value that may be based on the Doppler shift values at one or more TRP. The higher-layer parameter may appear in DMRS-DownlinkConfig IE, DownlinkConfig-Common IE, ServingCellConfig, PDSCH-Config, PDSCH-ServingCellConfig, or BWP-DownlinkDedicated. Also, configuring this higher-layer parameter may be dependent on an indication of a HST-SFN transmission scheme.

In various embodiments, an additional bit in a DCI field or an additional parameter may be indicated by an existing field in DCI (e.g., DCI field 'Transmission Configuration Indication' may indicate TCI states and whether offset frequency pre-compensation is applied) is used (e.g., by configuring a higher layer parameter such as an offset-frequency-Precompensation-PresentInDCI) that indicates whether offset frequency pre-compensation is applied to one or more of TRS, DMRS for PDSCH, and DMRS for PDCCH. Also, configuring the DCI to include the presence of the additional bit may be dependent on an indication of a HST-SFN transmission scheme.

In certain embodiments, a configuration or presence of offset frequency pre-compensation indication (e.g., higher-layer parameter, bit field) may implicitly indicate a use of a HST-SFN transmission scheme.

In some embodiments, a use of a HST-SFN transmission scheme and application of offset frequency pre-compensation to one or more of TRS, DMRS for PDSCH, and DMRS for PDCCH may be Jointly indicated. For example, a joint indication may be a higher-layer parameter (e.g., may appear in DMRS-DownlinkConfig IE, DownlinkConfigCommon IE, ServingCellConfig, PDSCH-Config, PDSCH-Serving-CellConfig, or BWP-DownlinkDedicated), an additional bit, or an additional parameter. In some examples, the indication (e.g., if present) may indicate HST-SFN with offset frequency pre-compensation and/or HST-SFN without offset frequency pre-compensation.

In various embodiments, offset frequency pre-compensation may be implied whenever a UE is configured with a TCI state that indicates a TRS is quasi-co-located with a DMRS for PDSCH and/or DMRS for PDCCH via one or more QCL types that do not include either Doppler shift or Doppler spread. In one example, a new QCL type 'QCL-TypeE' is used that indicates the TRS is QCLed with a DMRS for PDSCH and/or a DMRS for PDCCH in terms of one of the following four sets of large-scale parameters ({Average Delay, Delay spread}, {Average Delay}, {Delay Spread}, {None}) and 'QCL-TypeD', if applicable.

In certain embodiments, offset frequency pre-compensation is UE-triggered (e.g., based on UE signaling to a network or a UE capability).

In some embodiments, there may be a Doppler indication.

In various embodiments, Doppler shift values from one or more TRPs under HST-SFN transmission may be either inferred at a network side from an UL and/or DL RSs transmitted (e.g., UL SRSs), or may be explicitly reported via UL UCI signaling (e.g., CSI feedback, or a mixture of implicit and explicit Doppler indications).

In certain embodiments, a UE may be configured with reporting Doppler indicators.

In some embodiments, whenever a HST-SFN transmission is indicated, a UE may be configured with a report quantity that includes a Doppler indication in one or more CSI-ReportConfig reporting settings (e.g., introducing new possible values to the higher-layer parameter reportQuantity reporting quantities indicated in CSI reporting setting—such as 'cri-RI-PMI-CQI-DI'), where DI is a new quantity representing Doppler indication.

In various embodiments, whenever HST-SFN transmission is indicated, a UE may be configured with a higher-layer parameter that indicates Doppler reporting (e.g., a new higher-layer parameter DopplerIndicator that if set to 'true' or '1', a UE reports one or more Doppler indicator values). The higher-layer parameter may be part of a CSI-Report-Config reporting setting IE, a CodebookConfig codebook configuration IE, or another IE related to CSI, DMRS, PDSCH, and/or downlink configuration.

In certain embodiments, there may be reporting Doppler indicators. In some embodiments, a UE may report one or more indicators that represent one or more Doppler shift values, wherein the indicator values may be reported in Part 1 of a CSI report, or in any of the groups (e.g., partitions) of Part 2 of a CSI report.

In various embodiments, each of the one or more Doppler indicator values takes on a value from one or more predefined sets of values that correspond to a Doppler shift value. The indicator values may refer to absolute (e.g., not relative, including positive or negative sign) Doppler values, or differential offset values computed with respect to a reference Doppler value.

In one embodiment, two Doppler indicator values are reported, wherein each of the Doppler indicator values represent the Doppler shift from one TRP, taking on a value from a set $\mathfrak{D}=\{\delta_0, \delta_1, \ldots, \delta_{M-1}\}$ with M elements (e.g., value of log 2M Doppler indicator bit-field). In one example, the Doppler shift value Ds,a for TRP a would then be in the form Ds,a=Ds($\delta$(a)), where Ds($\delta$(a)) represents the mapped Doppler value to the indicator $\delta$(a) that represents the reported Doppler indicator value corresponding to TRP a. The Doppler shift value Ds,b for TRP b would then be in the form Ds,b=−Ds($\delta$(b)). Both Doppler shift values may have opposing signs.

In another embodiment, one Doppler indicator value is reported, wherein the Doppler indicator value represents the Doppler shift from each TRP with opposite signs, taking on a value from a set $\mathfrak{D}=\{\delta_0, \delta_1, \ldots, \delta_{M-1}\}$ with M elements. In one example, the Doppler shift value Ds,a for TRP a would then be in the form Ds,a=Ds($\delta$), where Ds($\delta$) represents the mapped Doppler value to the indicator $\delta$ that represents the reported Doppler indicator value. The Doppler shift value Ds,b for TRP b would then be in the form Ds,b=−Ds($\delta$).

In yet another embodiment, two Doppler indicator values are reported, wherein each of the Doppler indicator values represent offset Doppler values with respect to a reference Doppler value that is either inferred from an RS, fixed in a specification, or higher-layer configured (e.g., indicated as multiple of a predetermined resolution value (e.g., 100 Hz) or multiple of the subcarrier spacing). Each of the Doppler indicator values reported take on a value from a set $\mathcal{D} = \{\delta_0, \delta_1, \ldots, \delta_{M-1}\}$ with M elements. In one example, the Doppler shift value Ds,a for TRP a would then be in the form Ds,a=Ds,ref+Ds($\delta$(a)), where Ds,ref is the reference Doppler value, and Ds($\delta$(a)) represents the mapped Doppler value to the indicator $\delta$(a) that represents the reported Doppler indicator value corresponding to TRP a. The Doppler shift value Ds,b for TRP b would then be in the form Ds,b=−Ds,ref−Ds($\delta$(b)). In another example, Ds,b=−Ds,ref+Ds($\delta$(b)). In one embodiment, the sign used for the reference Doppler value is also reported (e.g., 1 bit for the reference Doppler value sign).

In another embodiment, one Doppler indicator value is reported, wherein the Doppler indicator value represents an offset Doppler value with respect to a reference Doppler value that is either inferred from an RS, fixed, or higher-layer configured. The Doppler indicator value reported takes on a value from a set $\mathcal{D} = \{\delta_0, \delta_1, \ldots, \delta_{M-1}\}$ with M elements. In one example, the Doppler shift value Ds,a for TRP a would then be in the form Ds,a=Ds,ref+Ds($\delta$), where Ds,ref is the reference Doppler value, and Ds($\delta$) represents the mapped Doppler value to the indicator $\delta$ that represents the reported Doppler indicator value. The Doppler shift value Ds,b for TRP b would then be in the form Ds,b=−Ds, ref−Ds($\delta$). In one embodiment, the sign used for the reference Doppler value is also reported (e.g., 1 bit for the reference Doppler value sign).

The reference Doppler shift value, Ds,ref, may be based on a Doppler shift value estimated from an SRS, higher-layer configured, fixed, or UE selected from a second set $\mathcal{D}_{ref} = \{\delta'_0, \delta'_1, \ldots, \delta'_{N-1}\}$ with N elements.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mm-Wave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL- TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 4:
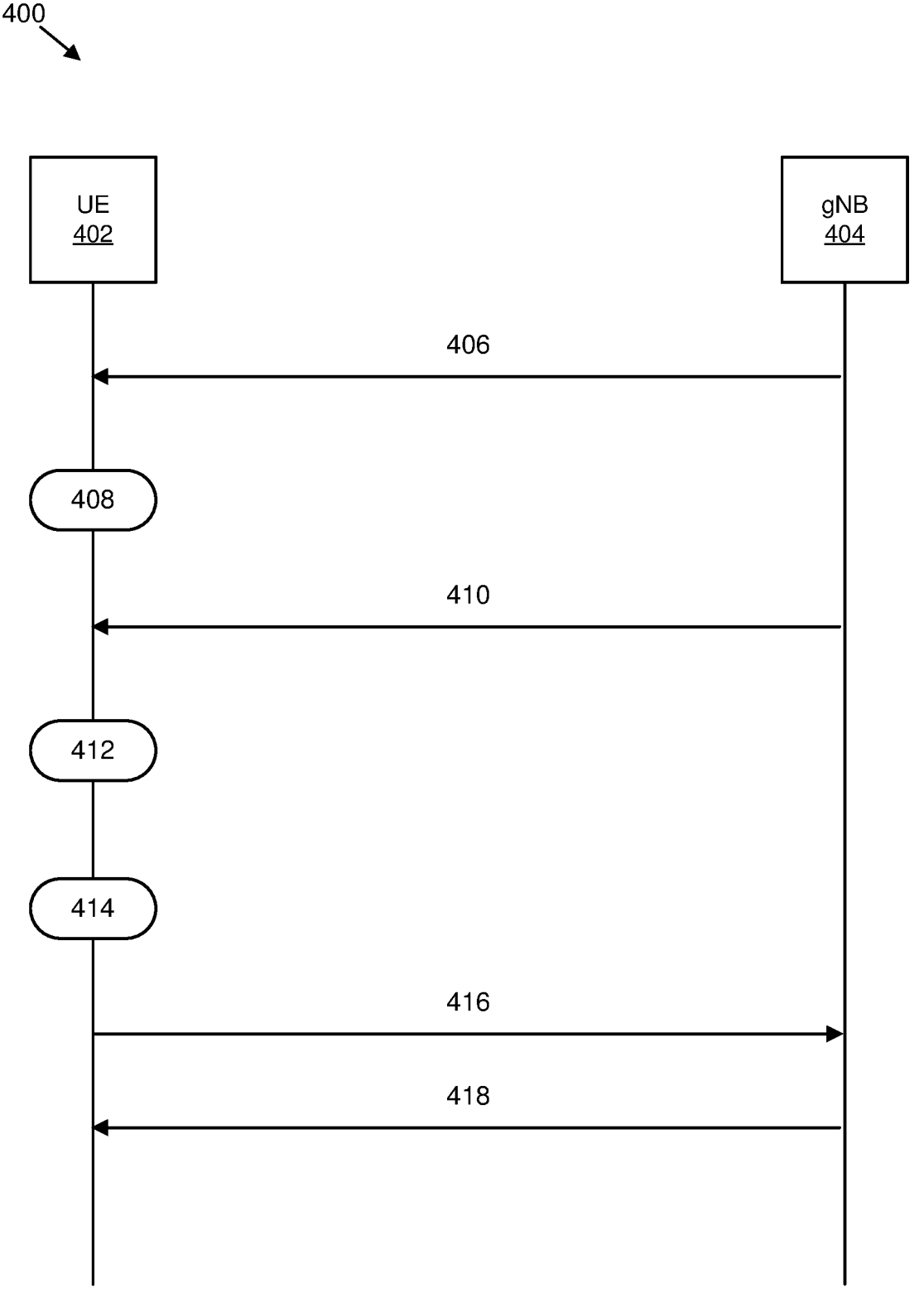
FIG. 4 is a schematic block diagram illustrating one embodiment of a system for configuring tracking reference signal resources.

FIG. 4 is a schematic block diagram illustrating one embodiment of a system 400 for configuring tracking reference signal resources. The system 400 includes a UE 402 and a gNB 404. In a first communication 406, an indication of a high speed train (HST) single frequency network (SFN) transmission is received from at least one transmission and reception point (TRP) in a network (e.g., gNB 404). The UE 402 is configured 408 with two tracking reference signal (TRS) resources. In a second communication 410, a downlink scheduling grant is received. The downlink scheduling grant includes a transmission configuration indicator (TCI) codepoint indicating two TCI states corresponding to the two TRS resources. The UE 402 is configured 412 to report at least one Doppler indicator value to the network based on received TRSs. The UE 402 identifies 414 the at least one Doppler indicator value. In a third communication 416, the UE 402 reports the at least one Doppler indicator value to the network. In a fourth communication 418, the UE 402 receives at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value.

Figure 5:
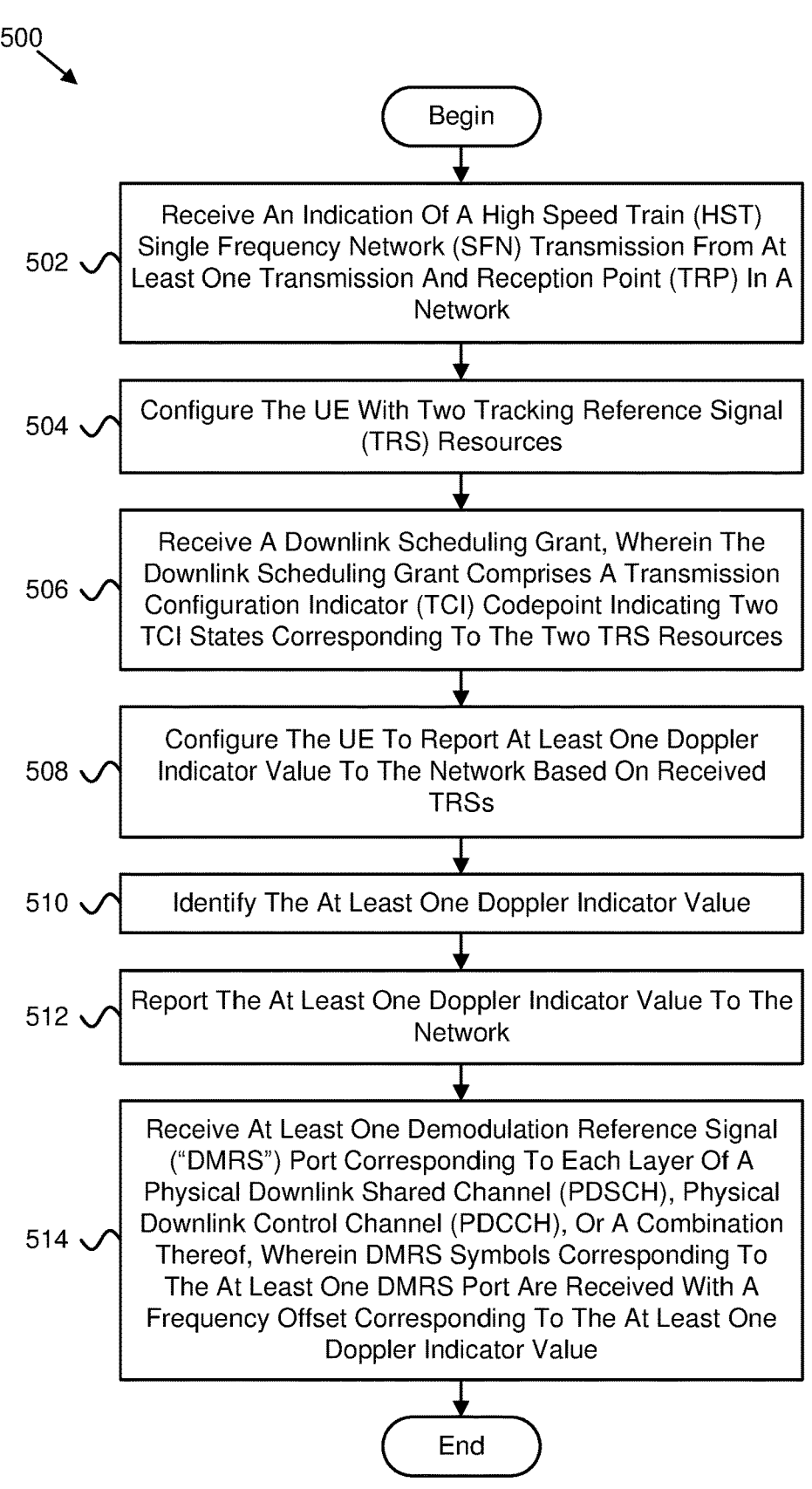
FIG. 5 is a flow chart diagram illustrating one embodiment of a method for configuring tracking reference signal resources.

FIG. 5 is a flow chart diagram illustrating one embodiment of a method 500 for configuring tracking reference signal resources. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes receiving 502, at a user equipment (UE), an indication of a high speed train (HST) single frequency network (SFN) transmission from at least one transmission and reception point (TRP) in a network. In some embodiments, the method 500 includes configuring 504 the UE with two tracking reference signal (TRS) resources. In certain embodiments, the method 500 includes receiving 506 a downlink scheduling grant. The downlink scheduling grant includes a transmission configuration indicator (TCI) codepoint indicating two TCI states corresponding to the two TRS resources. In various embodiments, the method 500 includes configuring 508 the UE to report at least one Doppler indicator value to the network based on received TRSs. In some embodiments, the method 500 includes identifying 510 the at least one Doppler indicator value. In certain embodiments, the method 500 includes reporting 512 the at least one Doppler indicator value to the network. In various embodiments, the method 500 includes receiving 514 at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value.

In certain embodiments, the TCI codepoint indicates a quasi-co-location (QCL) relationship between each TRS of the two TRS resources, the at least one DMRS port corresponding to each layer of the PDSCH, the PDCCH, or the combination thereof is set to 'QCL-TypeA', a first TRS of the two TRSs is QCLed in terms of at least Doppler shift and Doppler spread, and a second TRS of the two TRSs is not QCLed in terms of at least Doppler shift or Doppler spread. In some embodiments, the method 500 further comprises configuring the UE to report the at least one Doppler indicator value based on: a reporting quantity in a channel state information (CSI) reporting configuration; a high layer parameter in a CSI reporting setting, a codebook configuration, or a combination thereof, a high layer parameter within a PDSCH configuration, a PDCCH configuration, or a combination thereof, or some combination thereof.

In various embodiments, the at least one Doppler indicator value is selected from a codebook of a configured set, a fixed set, a pre-defined set, or some combination thereof of Doppler values, and a size of the codebook of values is fixed. In one embodiment, two Doppler indicator values of the at least one Doppler indicator value are reported corresponding to the two TRS resources. In certain embodiments, a first Doppler indicator of the two Doppler indicators is assigned a different Doppler shift sign from a second Doppler indicator of the two Doppler indicators.

In some embodiments, one Doppler indicator value is reported corresponding to the two TRS resources. In various embodiments, the one Doppler indicator value corresponds to the two TRSs, and a first Doppler indicator value corresponding to a first TRS resource of the two TRS resources is assigned an opposite sign to a second Doppler indicator value corresponding to a second TRS resource of the two TRS resources. In one embodiment, the one Doppler indicator value corresponds to an absolute Doppler shift value or a differential Doppler shift value based on a reference Doppler shift value, and the reference Doppler value is fixed, reported, or inferred from a reference signal or is high layer configured.

In certain embodiments, one Doppler indicator value is reported corresponding to a first TRS reference of the two TRS references, and the one Doppler indicator value is computed with respect to a reference Doppler shift value that is determined based on a second TRS reference of the two TRS references. In some embodiments, each Doppler indicator value of the at least one Doppler indicator value is fed back in a Part 1 of a CSI report, a one group of Part 2 of the CSI report, or a combination thereof.

Figure 6:
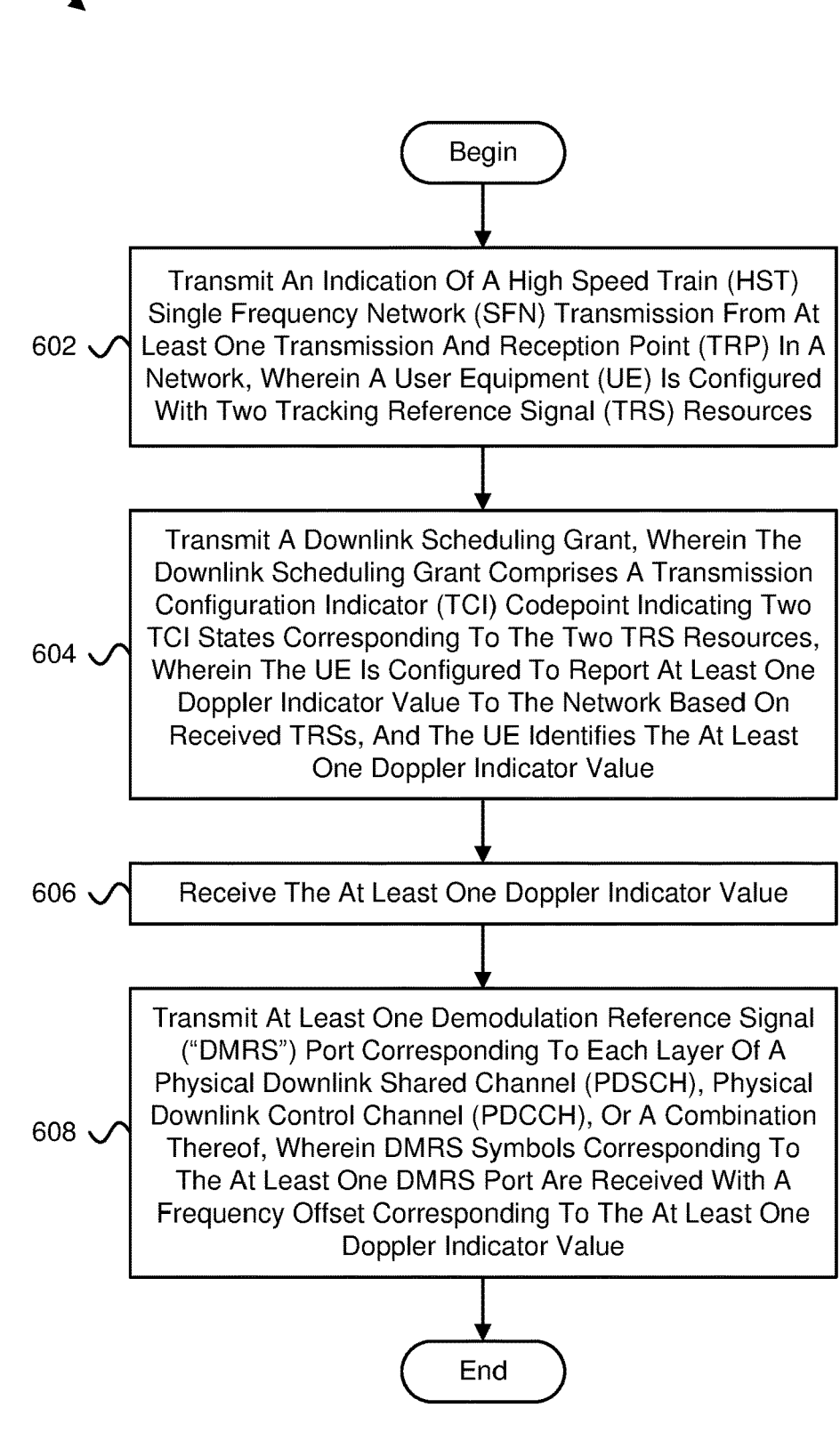
FIG. 6 is a flow chart diagram illustrating another embodiment of a method for configuring tracking reference signal resources.

FIG. 6 is a flow chart diagram illustrating another embodiment of a method 600 for configuring tracking reference signal resources. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes transmitting 602 an indication of a high speed train (HST) single frequency network (SFN) transmission from at least one transmission and reception point (TRP) in a network. A user equipment (UE) is configured with two tracking reference signal (TRS) resources. In some embodiments, the method 600 includes transmitting 604 a downlink scheduling grant. The downlink scheduling grant includes a transmission configuration indicator (TCI) codepoint indicating two TCI states corresponding to the two TRS resources. The UE is configured to report at least one Doppler indicator value to the network based on received TRSs, and the UE identifies the at least one Doppler indicator value. In certain embodiments, the method 600 includes receiving 606 the at least one Doppler indicator value. In various embodiments, the method 600 includes transmitting 608 at least one demodulation reference signal ("DMRS") port corresponding to each layer of a physical downlink shared channel (PDSCH), physical downlink control channel (PDCCH), or a combination thereof. DMRS symbols corresponding to the at least one DMRS port are received with a frequency offset corresponding to the at least one Doppler indicator value.

In one embodiment, a method of a user equipment (UE) comprises: receiving an indication of a high speed train (HST) single frequency network (SFN) transmission from at least one transmission and reception point (TRP) in a network; configuring the UE with two tracking reference signal (TRS) resources; receiving a downlink scheduling grant, wherein the downlink scheduling grant comprises a transmission configuration indicator (TCI) codepoint indicating two TCI states corresponding to the two TRS resources; configuring the UE to report at least one Doppler indicator value to the network based on received TRSs; identifying the at least one Doppler indicator value; reporting the at least one Doppler indicator value to the network; and receiving at least one demodulation reference signal ("DMRS") port corresponding to each layer of a physical downlink shared channel (PDSCH), physical downlink control channel (PDCCH), or a combination thereof, wherein DMRS symbols corresponding to the at least one DMRS port are received with a frequency offset corresponding to the at least one Doppler indicator value.

In certain embodiments, the TCI codepoint indicates a quasi-co-location (QCL) relationship between each TRS of the two TRS resources, the at least one DMRS port corresponding to each layer of the PDSCH, the PDCCH, or the combination thereof is set to 'QCL-TypeA', a first TRS of the two TRSs is QCLed in terms of at least Doppler shift and Doppler spread, and a second TRS of the two TRSs is not QCLed in terms of at least Doppler shift or Doppler spread.

In some embodiments, the method further comprises configuring the UE to report the at least one Doppler indicator value based on: a reporting quantity in a channel state information (CSI) reporting configuration; a high layer parameter in a CSI reporting setting, a codebook configuration, or a combination thereof, a high layer parameter within a PDSCH configuration, a PDCCH configuration, or a combination thereof, or some combination thereof.

In various embodiments, the at least one Doppler indicator value is selected from a codebook of a configured set, a fixed set, a pre-defined set, or some combination thereof of Doppler values, and a size of the codebook of values is fixed.

In one embodiment, two Doppler indicator values of the at least one Doppler indicator value are reported corresponding to the two TRS resources.

In certain embodiments, a first Doppler indicator of the two Doppler indicators is assigned a different Doppler shift sign from a second Doppler indicator of the two Doppler indicators.

In some embodiments, one Doppler indicator value is reported corresponding to the two TRS resources.

In various embodiments, the one Doppler indicator value corresponds to the two TRSs, and a first Doppler indicator value corresponding to a first TRS resource of the two TRS resources is assigned an opposite sign to a second Doppler indicator value corresponding to a second TRS resource of the two TRS resources.

In one embodiment, the one Doppler indicator value corresponds to an absolute Doppler shift value or a differential Doppler shift value based on a reference Doppler shift value, and the reference Doppler value is fixed, reported, or inferred from a reference signal or is high layer configured.

In certain embodiments, one Doppler indicator value is reported corresponding to a first TRS reference of the two TRS references, and the one Doppler indicator value is computed with respect to a reference Doppler shift value that is determined based on a second TRS reference of the two TRS references.

In some embodiments, each Doppler indicator value of the at least one Doppler indicator value is fed back in a Part 1 of a CSI report, a one group of Part 2 of the CSI report, or a combination thereof.

In one embodiment, an apparatus comprises a user equipment (UE). The apparatus further comprises: a receiver that receives an indication of a high speed train (HST) single frequency network (SFN) transmission from at least one transmission and reception point (TRP) in a network; a processor that configures the UE with two tracking reference signal (TRS) resources; and a transmitter, wherein: the receiver receives a downlink scheduling grant, wherein the downlink scheduling grant comprises a transmission configuration indicator (TCI) codepoint indicating two TCI states corresponding to the two TRS resources; the processor configures the UE to report at least one Doppler indicator value to the network based on received TRSs; the processor identifies the at least one Doppler indicator value; the transmitter reports the at least one Doppler indicator value to the network; and the receiver receives at least one demodulation reference signal ("DMRS") port corresponding to each layer of a physical downlink shared channel (PDSCH), physical downlink control channel (PDCCH), or a combination thereof, wherein DMRS symbols corresponding to the at least one DMRS port are received with a frequency offset corresponding to the at least one Doppler indicator value.

In certain embodiments, the one Doppler indicator value corresponds to an absolute Doppler shift value or a differential Doppler shift value based on a reference Doppler shift value, and the reference Doppler value is fixed, reported, or inferred from a reference signal or is high layer configured.

In some embodiments, the at least one Doppler indicator value is selected from a codebook of a configured set, a fixed set, a pre-defined set, or some combination thereof of Doppler values, and a size of the codebook of values is fixed.

In one embodiment, a method of a network device comprises: transmitting an indication of a high speed train (HST) single frequency network (SFN) transmission from at least one transmission and reception point (TRP) in a network, wherein a user equipment (UE) is configured with two tracking reference signal (TRS) resources; transmitting a downlink scheduling grant, wherein the downlink scheduling grant comprises a transmission configuration indicator (TCI) codepoint indicating two TCI states corresponding to the two TRS resources, wherein the UE is configured to report at least one Doppler indicator value to the network based on received TRSs, and the UE identifies the at least one Doppler indicator value; receiving the at least one Doppler indicator value; and transmitting at least one demodulation reference signal ("DMRS") port corresponding to each layer of a physical downlink shared channel (PDSCH), physical downlink control channel (PDCCH), or a combination thereof, wherein DMRS symbols corresponding to the at least one DMRS port are received with a frequency offset corresponding to the at least one Doppler indicator value.

In one embodiment, an apparatus comprises a network device. The apparatus further comprises: a transmitter that transmits an indication of a high speed train (HST) single frequency network (SFN) transmission from at least one transmission and reception point (TRP) in a network, wherein a user equipment (UE) is configured with two tracking reference signal (TRS) resources; and a receiver, wherein: the transmitter transmits a downlink scheduling grant, wherein the downlink scheduling grant comprises a transmission configuration indicator (TCI) codepoint indicating two TCI states corresponding to the two TRS resources, wherein the UE is configured to report at least one Doppler indicator value to the network based on received TRSs, and the UE identifies the at least one Doppler indicator value; the receiver receives the at least one Doppler indicator value; and the transmitter transmits at least one demodulation reference signal ("DMRS") port corresponding to each layer of a physical downlink shared channel (PDSCH), physical downlink control channel (PDCCH), or a combination thereof, wherein DMRS symbols corresponding to the at least one DMRS port are received with a frequency offset corresponding to the at least one Doppler indicator value.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving an indication of a high speed train (HST) single frequency network (SFN) transmission from at least one transmission and reception point (TRP) in a network;

configuring the UE with two tracking reference signal (TRS) resources;

receiving a downlink scheduling grant, wherein the downlink scheduling grant comprises a transmission configuration indicator (TCI) codepoint indicating two TCI states corresponding to the two TRS resources;

configuring the UE to report at least one Doppler indicator value to the network based on received TRSs;

identifying the at least one Doppler indicator value;

reporting the at least one Doppler indicator value to the network;

receiving information indicating at least one demodulation reference signal ("DMRS") port corresponding to each layer of a physical downlink shared channel (PDSCH), physical downlink control channel (PDCCH), or a combination thereof; and receiving DMRS symbols corresponding to the at least one DMRS port with a frequency offset corresponding to the at least one Doppler indicator value.

2. The method of claim 1, wherein the TCI codepoint indicates a quasi-co-location (QCL) relationship between each TRS of the two TRS resources, the at least one DMRS port corresponding to each layer of the PDSCH, the PDCCH, or the combination thereof is set to 'QCL-TypeA', a first TRS of the two TRSs is QCLed in terms of at least Doppler shift and Doppler spread, and a second TRS of the two TRSs is not QCLed in terms of at least Doppler shift or Doppler spread.

3. The method of claim 1, further comprising configuring the UE to report the at least one Doppler indicator value based on:

a reporting quantity in a channel state information (CSI) reporting configuration;

a high layer parameter in a CSI reporting setting, a codebook configuration, or a combination thereof;

a high layer parameter within a PDSCH configuration, a PDCCH configuration, or a combination thereof;

or a combination thereof.

4. The method of claim 1, wherein the at least one Doppler indicator value is selected from a codebook of a configured set, a fixed set, a pre-defined set, or a combination thereof of Doppler values, and a size of the codebook of values is fixed.

5. The method of claim 1, wherein two Doppler indicator values of the at least one Doppler indicator value are reported corresponding to the two TRS resources.

6. The method of claim 5, wherein a first Doppler indicator of the two Doppler indicators is assigned a different Doppler shift sign from a second Doppler indicator of the two Doppler indicators.

7. The method of claim 1, wherein one Doppler indicator value is reported corresponding to the two TRS resources.

8. The method of claim 7, wherein the one Doppler indicator value corresponds to the two TRSs, and a first Doppler indicator value corresponding to a first TRS resource of the two TRS resources is assigned an opposite sign to a second Doppler indicator value corresponding to a second TRS resource of the two TRS resources.

9. The method of claim 1, wherein the one Doppler indicator value corresponds to an absolute Doppler shift value or a differential Doppler shift value based on a reference Doppler shift value, and the reference Doppler value is fixed, reported, or inferred from a reference signal or is high layer configured.

10. The method of claim 1, wherein one Doppler indicator value is reported corresponding to a first TRS reference of the two TRS references, and the one Doppler indicator value is computed with respect to a reference Doppler shift value that is determined based on a second TRS reference of the two TRS references.

11. The method of claim 1, wherein each Doppler indicator value of the at least one Doppler indicator value is fed back in a Part 1 of a CSI report, a one group of Part 2 of the CSI report, or a combination thereof.

12. A user equipment (UE), comprising:

at least one memory; and at least one processor coupled with the at least one memory and configured to cause the UE to:

receive an indication of a high speed train (HST) single frequency network (SFN) transmission from at least one transmission and reception point (TRP) in a network;

configure the UE with two tracking reference signal (TRS) resources;

receive a downlink scheduling grant, wherein the downlink scheduling grant comprises a transmission configuration indicator (TCI) codepoint indicating two TCI states corresponding to the two TRS resources;

configure the UE to report at least one Doppler indicator value to the network based on received TRSs;

identify the at least one Doppler indicator value;

report the at least one Doppler indicator value to the network;

receive information indicating at least one demodulation reference signal ("DMRS") port corresponding to each layer of a physical downlink shared channel (PDSCH), physical downlink control channel (PDCCH), or a combination thereof; and receive DMRS symbols corresponding to the at least one DMRS port with a frequency offset corresponding to the at least one Doppler indicator value.

13. The UE of claim 12, wherein the one Doppler indicator value corresponds to an absolute Doppler shift value or a differential Doppler shift value based on a reference Doppler shift value, and the reference Doppler value is fixed, reported, or inferred from a reference signal or is high layer configured.

14. The UE of claim 12, wherein the at least one Doppler indicator value is selected from a codebook of a configured set, a fixed set, a pre-defined set, or a combination thereof of Doppler values, and a size of the codebook of values is fixed.

15. A base station, comprising:

at least one memory; and at least one processor coupled with the at least one memory and configured to cause the base station to:

transmit an indication of a high speed train (HST) single frequency network (SFN) transmission from at least one transmission and reception point (TRP) in a network, wherein a user equipment (UE) is configured with two tracking reference signal (TRS) resources;

transmit a downlink scheduling grant, wherein the downlink scheduling grant comprises a transmission configuration indicator (TCI) codepoint indicating two TCI states corresponding to the two TRS resources, wherein the UE is configured to report at least one Doppler indicator value to the network based on received TRSs, and the UE identifies the at least one Doppler indicator value;

receive the at least one Doppler indicator value;

transmit information indicating at least one demodulation reference signal ("DMRS") port corresponding to each layer of a physical downlink shared channel (PDSCH), physical downlink control channel (PDCCH), or a combination thereof; and transmit DMRS symbols corresponding to the at least one DMRS port are a frequency offset corresponding to the at least one Doppler indicator value.

16. A processor for wireless communication, comprising:

at least one controller coupled with at least one memory and configured to cause the processor to:

receive an indication of a high speed train (HST) single frequency network (SFN) transmission from at least one transmission and reception point (TRP) in a network;

configure the processor with two tracking reference signal (TRS) resources;

receive a downlink scheduling grant, wherein the downlink scheduling grant comprises a transmission configuration indicator (TCI) codepoint indicating two TCI states corresponding to the two TRS resources;

configure the processor to report at least one Doppler indicator value to the network based on received TRSs;

identify the at least one Doppler indicator value;

report the at least one Doppler indicator value to the network;

receive information indicating at least one demodulation reference signal ("DMRS") port corresponding to each layer of a physical downlink shared channel (PDSCH), physical downlink control channel (PDCCH), or a combination thereof; and receive DMRS symbols corresponding to the at least one DMRS port with a frequency offset corresponding to the at least one Doppler indicator value.

17. The processor of claim 16, wherein the TCI codepoint indicates a quasi-co-location (QCL) relationship between each TRS of the two TRS resources, the at least one DMRS port corresponding to each layer of the PDSCH, the PDCCH, or the combination thereof is set to 'QCL-TypeA', a first TRS of the two TRSs is QCLed in terms of at least Doppler shift and Doppler spread, and a second TRS of the two TRSs is not QCLed in terms of at least Doppler shift or Doppler spread.

18. The processor of claim 16, wherein the at least one controller is configured to cause the processor to report the at least one Doppler indicator value based on:

a reporting quantity in a channel state information (CSI) reporting configuration;

a high layer parameter in a CSI reporting setting, a codebook configuration, or a combination thereof;

a high layer parameter within a PDSCH configuration, a PDCCH configuration, or a combination thereof;

or a combination thereof.

19. The processor of claim 16, wherein the at least one Doppler indicator value is selected from a codebook of a configured set, a fixed set, a pre-defined set, or a combination thereof of Doppler values, and a size of the codebook of values is fixed.

20. The processor of claim 16, wherein two Doppler indicator values of the at least one Doppler indicator value are reported corresponding to the two TRS resources.

* * * * *